Dec. 20, 1960   J. D. GWYN ET AL   2,964,809
MULTIPLE GLASS SHEET GLAZING UNIT AND METHOD OF FABRICATION
Filed Nov. 13, 1957   2 Sheets-Sheet 1
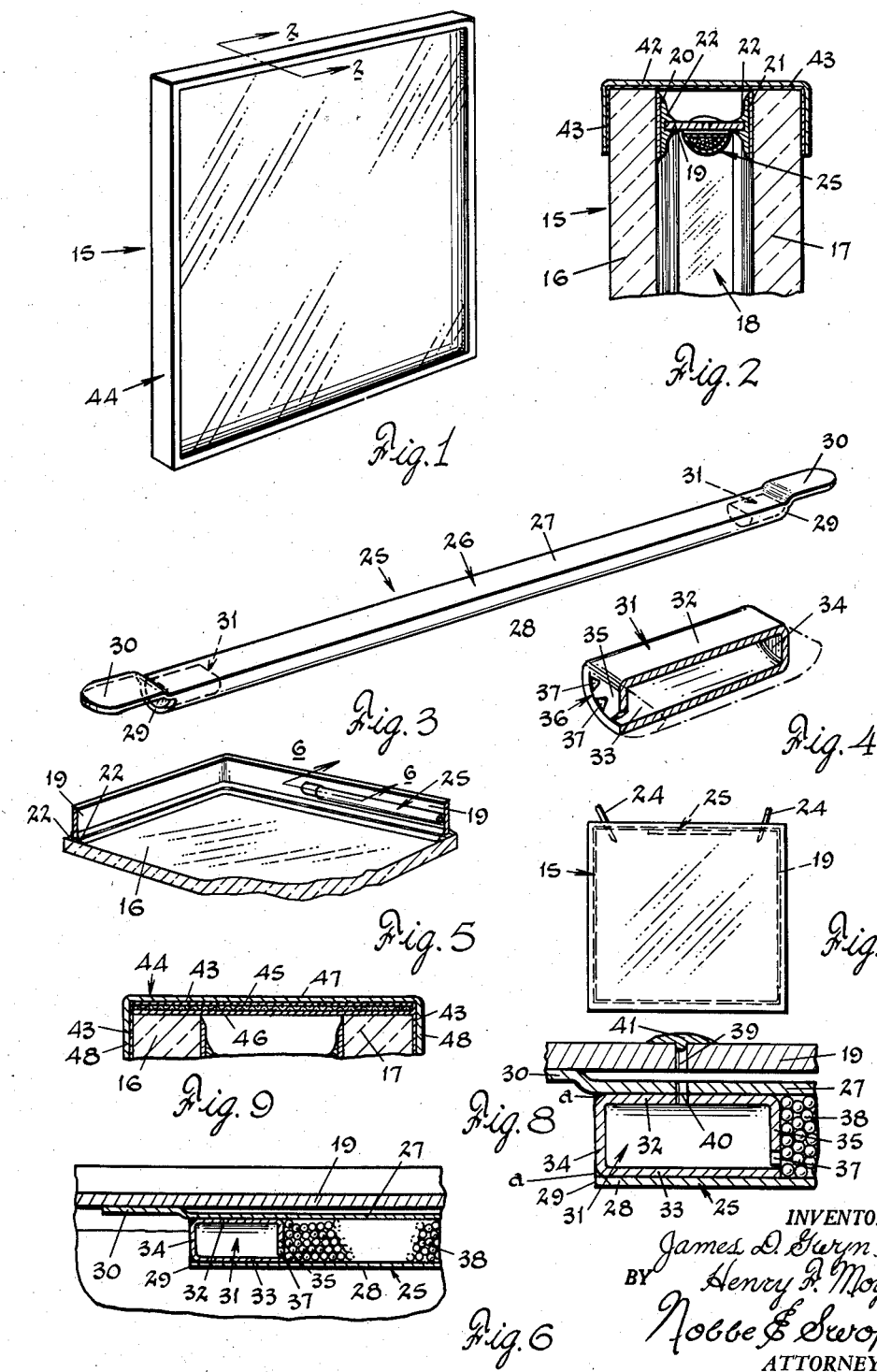
INVENTORS
James D. Gwyn and
Henry P. Moyer
BY
Nobbe & Swope
ATTORNEYS Dec. 20, 1960    J. D. GWYN ET AL    2,964,809
MULTIPLE GLASS SHEET GLAZING UNIT AND METHOD OF FABRICATION
Filed Nov. 13, 1957    2 Sheets-Sheet 2

INVENTORS
James D. Gwyn and
BY Henry F. Moyer
Nobbe & Swope
ATTORNEYS

United States Patent Office 2,964,809
Patented Dec. 20, 1960

2,964,809

MULTIPLE GLASS SHEET GLAZING UNIT AND METHOD OF FABRICATION

James D. Gwyn, Perrysburg, and Henry F. Moyer, Millbury, Ohio, assignors to Libbey-Owens-Ford Glass Company, Toledo, Ohio, a corporation of Ohio Filed Nov. 13, 1957, Ser. No. 696,109

7 Claims. (Cl. 20—56.5)

The present invention relates to improvements in multiple glass sheet, insulating, glazing units and to a novel method of fabricating the same.

The general type of glazing unit with which this invention is concerned consists of spaced sheets of glass which, preferably, are hermetically sealed together around the edges thereof to form a dead-air space or chamber therebetween which may be filled with dehydrated air or other gases, or exhausted to provide a partial vacuum. Such multiple sheet, insulating glazing units are well known and have been widely used to reduce heat transfer and to prevent condensation of moisture upon the glass in glazed openings.

However, the efficiency and success of this type of glazing unit has heretofore been dependent largely upon maintaining the space between the two sheets of glass hermetically sealed since should this seal be broken or develop even the slightest leak permitting atmospheric air to enter, the efficiency and insulating value of the unit is materially reduced.

Perhaps the most objectionable feature of the very small leaks that may develop in hermetically sealed multiple glass sheet glazing units, is the fact that sooner or later a unit which leaks, no matter how infinitesimal the opening in the seal, will begin to exhibit moisture condensation on the inside surfaces of the glass.

In some instances the leak is so small that it is undetectable by the standard manufacturing tests used to determine whether or not newly produced units are airtight. Consequently the unit may appear to be perfectly satisfactory, and be sold to and installed by the ultimate consumer on that basis; and only after continuous use, which may extend over months or even years, does the telltale condensation appear which shows that the unit is defective.

This situation has been extremely troublesome both to the manufacturer, and to the users of such units, and is responsible for extra labor costs and inconvenience to the user, and for high replacement costs and uncertainty for the manufacturers.

Briefly stated, it is proposed, according to the present invention, to effectively overcome these difficulties and to improve the quality, utility and life expectancy of conventional multi-glass sheet glazing units by the provision, inter alia, of an improved form of built-in dehydrating means for such units and a novel procedure for installing such means in position for use.

It is of course recognized that the broad idea of employing dehydrating or dessicant containing means in multi-sheet glazing units is not new. However, one defect that known devices of this character have always had, results from the fact that, the desiccant material is generally permitted to pick up moisture from the atmosphere at some time or other during the fabrication of the glazing unit and/or the installation of the desiccant in the unit.

On the other hand, this invention contemplates locating a desiccant material within a substantially sealed tubular member; securing the desiccant containing member to a part of the spacing means between the sheets; and creating an air passage between the desiccant material and the space sealed between the sheets only after dehydrated air has been introduced into that space.

Therefore a primary aim of the invention is to provide, in an improved multiple glass sheet glazing unit, having a hermetically sealed air space, a closed desiccant container adapted to be sealed therein and opened after the dehydration thereof.

Another object is to provide an improved desiccant container for multiple glass sheet glazing units, said container having a centrally disposed material receiving portion and substantially closed tubular end portions with means for restricted communication therebetween.

Another object of the invention is to provide an improved container of the above character for inclusion within the sealed air space of a multiple glass sheet glazing unit and for opening to the sealed air space after the dehydration of said unit.

Other objects and advantages of the invention will become more apparent during the course of the following description when taken in connection with the accompanying drawings.

In the drawings, wherein like numerals are employed to designate like parts throughout the same.

Fig. 1 is a perspective view of a multiple glass sheet glazing unit constructed in accordance with the invention;

Fig. 2 is a vertical transverse sectional view taken on line 2—2 of Fig. 1;

Fig. 3 is a perspective view of a desiccant container;

Fig. 4 is a perspective, partly in section, of an end closure plug for the container of Fig. 3;

Fig. 5 is a fragmentary perspective view illustrating a partially completed unit;

Fig. 6 is a vertical transverse sectional view taken on line 6—6 of Fig. 5 and particularly through an end of the container;

Fig. 7 is a diagrammatic view of an operation in the fabrication of the glazing unit;

Fig. 8 is a cross-sectional detail view, similar to Fig. 6, of the desiccant container in a completed container in a completed unit;

Fig. 9 is a view of a modified form of edge frame for the glazing unit;

Figure 10:
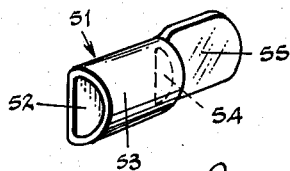
Fig. 10 is a perspective view of a mounting cap for the desiccant container.

With reference now to Figs. 1 and 2, of the drawings, there is disclosed one form of multiple glass sheet glazing unit, designated in its entirety by the numeral 15, with which the present invention can be employed. Such a unit comprises two sheets or plates of glass 16 and 17 arranged in spaced, substantially parallel relation to provide an air space 18 therebetween. This air space is formed by the provision of a metal separator strip 19 arranged entirely around the edge of the unit 15 and joined to the inner margin of the glass sheets 16 and 17 through the intermediary of metallic coatings 20 and 21 adherent to said sheets.

Multiple glass sheet glazing units of this general character may be fabricated substantially in accordance with the practices set forth in the patent to C. D. Haven et al., No. 2,235,681, issued March 18, 1941. Briefly stated, the perimeter of two glass sheets is provided with a tightly adherent metallic coating upon which is subsequently applied a layer of solder. A separator strip, such as the strip 19, formed of lead or a lead alloy and suitably equipped with a deposit of solder, is then joined to the metallic coatings when a suitable heating means, as a soldering iron, is employed to elevate the temperature of the solder coatings to produce fillets along the opposite surface thereof. This process is illustrated in Fig. 3, wherein a separator strip 19 is shown as properly positioned with reference to a glass sheet. More particularly, when the temperature of the solder coatings is elevated by heat the flow thereof will be induced to produce fillets 22 on the sides of the strip. As the solder coatings blend or amalgamate, the resulting single mass or volume of solder becomes permanently adherent to the separator strip and the metallized coating on the glass sheet and is shaped as a fillet for mechanical strength. During subsequent operations, the first glass sheet, such as the sheet 16, with the separator strip 19 united therewith, is placed in an inverted position on a second glass sheet, such as the sheet 17, whereupon working of the adjoining solder coatings joins the second sheet and separator strip to provide a completed multiple glass sheet glazing unit.

After the unit has been assembled, it is customary to insert hypodermic needles or the like, as indicated at 24 in Fig. 7, through the separator strip 19 and into the space 18 to remove the air therefrom and to replace it with dehydrated air or a suitable inert gas; and to then close the openings with drops of solder. This is to eliminate as completely as possible any moisture from the sealed air space 18 and to thereby maintain the inwardly disposed glass surfaces free from condensation.

As earlier set forth, however, all of this careful work may go for nought if even the slightest undetectable leak is present when the unit is fabricated or develops from rough handling or from other causes thereafter. And it is of the dehydrating feature of this invention to fully protect a unit of this character from the development of any moisture content in the air space thereof by continuously absorbing and/or adsorbing the same as fast as it can enter the unit. By calculating quantities proportionate to the size of the unit, sufficient dehydrating or desiccating material can be included to insure a permanency of dry air space for any number of years.

That is to say, the required quantity of desiccating material can be estimated according to the volume of the air space in the glazing unit and the size of any undetectable leak; and also this quantity can, on a practicable basis, be varied according to the circumstances of use or estimated life of the unit.

A preferred way of accomplishing this is shown in Fig. 5. During fabrication of the unit 15, a tubular member 25 is positioned against and secured to the inner surface of the separator strip 19. One excellent form of tubular member or container for desiccant material is disclosed in Fig. 3 wherein it will be seen that the container comprises an extruded metallic body 26 having a flat wall 27 and a substantially semi-cylindrical wall 28. The flat wall 27, it will be noted, has a lesser width than that of the separator strip 19. As well, this wall projects outwardly beyond the ends 29 of the wall portion 28 and these projections 30 are offset or the plane thereof is raised slightly above the plane of the major portion of wall 27 for a purpose to be hereinafter more fully described. The ends 29 of the wall portion 28 may be closed by means of tubular plugs 31 having a flat wall surface 32, a semi-cylindrical wall surface 33 and an integral vertically disposed end wall 34. The opposite end of the plug 31 (Fig. 4) is equipped with a wall 35 that is equipped in its edge 36 with notches 37. The edge 36 is suitably circularly shaped to interfit with the semi-cylindrical wall 33 so that communication from the interior of the plug 31 can be had through openings afforded by the notches 37.

When a plug 31 has been inserted into one end of the container 25, the associated end 29 of the container and the wall 34 of the plug are substantially hermetically sealed together by such a known method as "dip" soldering as indicated at "a", Fig. 8. Alternatively, the outer surface of the plug may be provided with a coating of a moisture-impervious cement and the plug then inserted into the container end. In either event, after the container has been filled with a desiccant material, it is believed quite apparent that insertion and sealing of a second plug 31 into the opposite end will substantially completely seal the container and the contents therein from the outside atmosphere. In other words, and in accordance with the embodiments of this invention, the desiccant containing member can be made up well in advance of its actual use and without loss of its efficiency by absorption or adsorption of moisture.

During fabrication of a multiple glass sheet glazing unit as disclosed in Fig. 5, and after the separator strip 19 has been joined to one glass sheet, a container 25 is positioned and secured along and against the inner surface thereof. While there apparently is no particular side of the unit on which the dehydrating influence can best be carried out, it has in most instances been found preferable to install the container 25 on either that portion of the separator strip which will be associated with the top or the bottom of the unit when the same is set in its position of use. The container 25 may be secured to the separator strip 19 at the projections or tabs 30 thereof as by spot welding. This will position the container 25 generally in parallelism with the strip 19 and more particularly the body portion 26 thereof in spaced relation from the strip 19 as is illustrated in Fig. 6. And, as previously mentioned, since the flat wall 27 of the body 26 is substantially narrower than the separator strip the container 25 will be spaced from either of the fillets 22 along the inner surface of said strip which will facilitate desired inspection thereof, as will be apparent in Fig. 5.

It is believed of considerable importance to emphasize the fact that during storage of the container and at the time of its installation the contents thereof are still and substantially completely sealed from moist atmosphere. Since the container is constructed and sealed in a similar manner at each of its ends, the disclosure of Fig. 6 is intended to indicate that the material 38, contained by the plugs 31, is restricted from entry into said plugs by the notched wall 35 although movement of air between the plugs 31 and the body 26 of the container is afforded through the notched openings 37.

Several compositions are known to be suitable for desiccating purposes and may include activated alumina, anhydrous calcium sulphate, silica gel and others. We have, however, found that so-called "Molecular Sieves" made up of sodium alumino silicates and calcium alumino silicates, either separately or as combined, have a remarkable capacity for rapid adsorption and length of activity. Moreover, Molecular Sieves, as herein described, have preferably been employed in such granular sizes as are commercially procurable in grades known as "14 x 30 mesh" or "8 x 12 mesh spheres."

A desiccant containing member of this novel character can be used during normally expected stoppages of production operations which occur during transfer of partially completed units, the exposure to atmosphere before completion of a unit into a substantially hermetically sealed structure and other typical work interruptions because the desiccant in the tube is not exposed to the atmosphere, and the entire capacity of the desiccant material is therefore retained free of any dissipating influence prior to complete fabrication of the unit.

After the glass sheets and separator strips of the units have been completely assembled with the desiccant container in place, and the air space between the glass hermetically sealed, the separator strip 19 may be punctured at two or more points (Fig. 7) to permit the insertion of hypodermic needles 24 or other tools which allow removal of the contained air and replacement by dehydrated air in the space 18. In most cases, dehydrated air at normal atmospheric pressure has been found satisfactory. After the gas content has been established and immediately upon withdrawal of the needles from the separator strip, the openings are soldered over to prevent ingress or egress of gas.

Finally the desiccant containing chamber of the dehydrating means is placed in communication with the air space 18 between the glass sheets. This can be done by the use of a fine drill or other tool. An opening 39 is made through the separator strip 19 with an aligned opening 40 being made in the wall 27 of the container and wall 32 of the associated plug 31 (Fig. 8). When the tool is removed, the opening 39 is immediately soldered over, as at 41, to close the same. This leaves the opening 40 unobstructed so as to permit free communication of air from the air space 18 through the said opening 40, the notches 37 of plug wall 35 to the desicant material 38 within the container 25. It will however be appreciated that there will be no immediate activation of such material since the formation of opening 40 was carried out in the hermetically sealed air space 18 and in an atmosphere of dehydrated air. And as a consequence of this novel feature to full efficiency of the desiccating material will be maintained until there is an ingress of moisture-laden air from some source.

The unit is now ready for use. However, as an added protective feature, it has been found desirable to protect the edges of the glass sheets and the glass to metal bond by means of a channel or cover that is adapted to be applied, as shown in Figs. 1 and 2, across the edges of the sheets and downwardly over the margins thereof. For this purpose, a strip of ductile metal such as lead may be used to advantage. This metal strip 42, having a thickness in the order of .015 of an inch, is coated as by spraying, with a suitable cementitious material as is indicated at 43, and is applied in a continuous length entirely around the unit to provide a frame 44.

Alternately, an adhesive film can be applied to one surface of the lead strip and then adhered to the glass surfaces. One type of adhesive film found suitable for this purpose is made by the Minnesota Mining and Mfg. Co. and sold commercially as EC-466. According ot this method of preparing the strip 42, the film is simultaneously stripped from its support tape and adhered to a surface of the metal strip.

Additionally, a layer 45 of cushioning material, such as rubber, glass fiber fabric or the like, can be positioned lingitudinally along the central area of the strip 42. This material is then covered by a further layer 46 of adhesive. This cushioning material, as shown in Fig. 9, is adapted to increase the protective features of the frame 44, and to assist in preventing fracture due to handling that might break the unit's hermetic seal. In either event the completed frame 44 will thus comprise a web 47 supported on the edges of the glass sheets 16 and 17 and with folded or spun over flanges 48 adheringly placed in surface contact with the margins of the outwardly directed surfaces of the glass sheets.

On the other hand, when the use of other or less ductile metals is desired, channels of suitable length and with chamfered ends can be employed.

Figure 11:
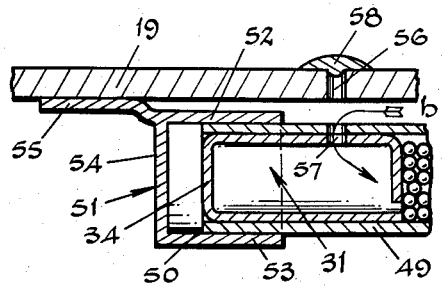
Fig. 11 is a detail cross-sectional view of a modified means for mounting the desiccant container.

While a container for desiccating materials may be of the structure shown in Fig. 3, certain modifications can be employed to advantage especially when the expansion characteristics of the material from which the container is made differ from those of the separator strip. The difference of expansion between the container and the separator strip is not particularly critical in the instance of short length containers or those used in connection with small-size units; however, when longer containers are required to provide sufficient desiccant for large-size double glazed units, such a difference between the expansion characteristics of the container and of the separator strip becomes more pronounced. For this purpose, the container 49 of Fig. 11 is finished with flat end portions 50 with which the end wall 34 of the closure plug 31 is substantially flush. Each end 50 of the container is slidably received in a mounting cap 51.

As illustrated in Fig. 10, this mounting member comprises a flat wall 52, a semi-cylindrical wall 53 and an end wall 54. The cap 51 is provided with a tap 55, for attaching purposes, which is offset from the plane of the wall 52 but otherwise is substantially parallel thereto. During the assembly of a double glazed unit, a mounting cap 51 is secured, as by spot-welding or like means, to the inner surface of the separator strip 19. An end 50 of the desiccant container is fitted into and between the walls 52 and 53 until said end is supported in but not engaged with the rear cap wall 54.

The opposite end of the container is, in the same manner, fitted with a mounting cap which is then secured to the separator strip 19 at the tab 55. As previously set forth, the container at this time is substantially hermetically sealed; however, upon drilling of the aligned holes 56 and 57 through strip 19 and the container 49 a passageway is created for movement of air, as indicated by the arrow b in Fig. 11. The hole 56 is of course immediately sealed by a drop of solder 58.

Figure 12:
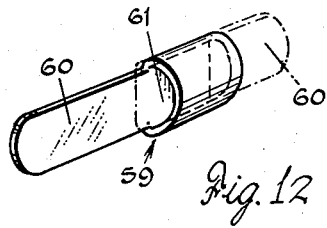
Fig. 12 is a perspective view of a modified form of mounting cap.
Figure 13:
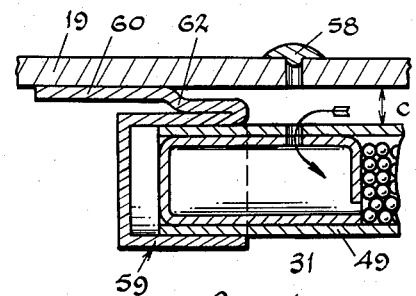
Fig. 13 is a detail cross-sectional view of a mounting arrangement employing the cap of Fig. 12.

The modified form of cap 59 shown in Fig. 12 provides a tab 60 formed as an extension of the flat wall 61. Before assembly of the cap into a double glazed unit, the tab 60 is adapted to be doubled back toward or against the wall 61 and then is attached to the separator strip 19. According to this construction, the tab 60 is also adapted to be additionally bent to provide an offset end portion 62 (Fig. 13). This enables the spacing c between the container 49 and the strip 19 to be increased if desired.

In either event, the container 49 is supported at its opposite ends in mounting caps 51 or 59, and the ends thereof are spaced from the respective end walls of the cap. Expansion or contraction of the strip 19 will thus be compensated for since the cap can slide relative to the ends of the container without objectionable separation.

Figure 14:
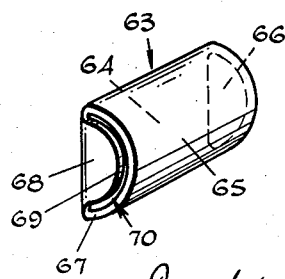
Fig. 14 is a perspective view of a modified closure plug for the desiccant tube.

In Fig. 14, there is shown a slightly modified form of closure plug for the desiccant containers as herein provided. The plug 63 is formed with a flat wall 64, semi-cylindrical wall 65 and end wall 66. The open end 67, however, is partially closed by a wall 68 having a semi-circular edge 69 of smaller radius than the radius of the inner surface of wall 65. When positioned, as shown in Fig. 14, said wall provides a semi-circular slot 70.

Although this invention has been specifically described, in connection with all glass-metal, hermetically sealed, multiple sheet glazing units, it will be obvious that it is also adapted for use with units that include materials other than glass and metal, with units that may be sealed or closed in different ways, and/or with units that are not hermetically sealed. In fact, it is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

We claim:

1. In a multiple glass sheet glazing unit comprising two sheets of glass held in spaced face-to-face relationship by a separating member to enclose a hermetically sealed space, an elongated container in the space between said sheets, means integral with said container for mounting said container in spaced relation to said separating member to provide a passageway therebetween opening into said air space, said container having an opening leading into said passageway, and a desiccant within said container.

2. An article as defined in claim 1 in which said container is mounted on said separating member and the means for mounting the container permits slipping of said container relative to said separating member to compensate for expansions and contractions thereof.

3. In a method of fabricating multiple glass sheet glazing units that comprise two sheets of glass held in spaced face-to-face relationship by a peripheral separating means to provide an enclosed space therebetween, the steps of mounting a closed container supplied with a desiccant in the space between the glass sheets onto and spaced from said separating means during assembly of the unit, forming openings through said separating means and said container after the unit has been assembled, and sealing the opening through said separator.

4. A method as defined in claim 3 in which the container is mounted on said separating means to leave a passageway therebetween opening into the space between the glass sheet and said openings are drilled through said separating means and into said container at a point where the latter will be in communication with said passageway.

5. In a multiple glass sheet glazing unit, comprising a pair of glass sheets held in spaced face-to-face relation by a separating member, an elongated hollow container having open ends disposed in the space between said sheets, means for mounting said container in spaced relation with respect to said separating member to provide a passageway therebetween opening into the space between the sheets, hollow closure means received within the open ends of said container, said closure means having a first opening leading into said container and a second opening leading into the passageway, and a desiccant contained within said container.

6. An article as defined in claim 5 in which the opening in said closure means leading into said container is arcuate in shape.

7. An article as defined in claim 5 in which the opening in said closure leading into said container is serrated.

References Cited in the file of this patent

UNITED STATES PATENTS

| | | |
|---|---|---|
| 2,303,125 | Knight | Nov. 24, 1942 |
| 2,305,957 | Edwards | Dec. 22, 1942 |
| 2,838,809 | Zeolla et al. | June 17, 1958 |